(12) United States Patent
Walters et al.

(10) Patent No.: US 7,886,634 B2
(45) Date of Patent: Feb. 15, 2011

(54) AUTOMATIC TRANSMISSION ARRANGEMENT FOR A MOTORCYCLE

(75) Inventors: Richard L. Walters, Plano, IL (US); Richard L. Walters, II, Lombard, IL (US)

(73) Assignee: Walters Manufacturing, Inc., Plano, IL (US)

( * ) Notice: Subject to any disclaimer, the term of this patent is extended or adjusted under 35 U.S.C. 154(b) by 527 days.

(21) Appl. No.: 11/900,469

(22) Filed: Sep. 12, 2007

(65) Prior Publication Data

US 2009/0069144 A1 Mar. 12, 2009

(51) Int. Cl.
*F16H 3/00* (2006.01)
*F16H 48/00* (2006.01)

(52) U.S. Cl. ........................ 74/810.1; 475/12

(58) Field of Classification Search ............... 74/810.1; 475/12, 201; 192/3.52, 3.53
See application file for complete search history.

(56) References Cited

U.S. PATENT DOCUMENTS 4,070,925 A * 1/1978 Yoshida ..................... 74/720
4,163,399 A * 8/1979 Yamada et al. ............. 74/732.1
5,030,179 A * 7/1991 Ganoung ..................... 475/50
6,807,927 B2 * 10/2004 Czysz ........................ 123/59.6
6,910,987 B2 * 6/2005 Richards ..................... 475/283
2006/0234829 A1 * 10/2006 Berger et al. .................. 477/52

* cited by examiner

*Primary Examiner*—Tisha D Lewis
(74) *Attorney, Agent, or Firm*—Erickson Law Group, PC

(57) ABSTRACT

A powertrain for a motorcycle includes a torque converter having an input and an output with a fluid coupling between the input and output, a gear train between the torque converter output and the rear wheel of the motorcycle, and an intermediate gear assembly that reverses the rotational direction of the motorcycle engine output shaft to the torque converter input. The intermediate gear assembly allows the motorcycle engine output shaft to be arranged in parallel with the torque converter input shaft wherein the motorcycle engine output shaft and the torque converter input shaft are on the same side of the motorcycle. The intermediate gear assembly includes a ring gear in meshing engagement with a plurality of planet gears, and a sun gear in meshing engagement with the planet gears. The ring gear is fixed for rotation with the intermediate input and the sun gear is fixed for rotation with the intermediate output.

11 Claims, 10 Drawing Sheets

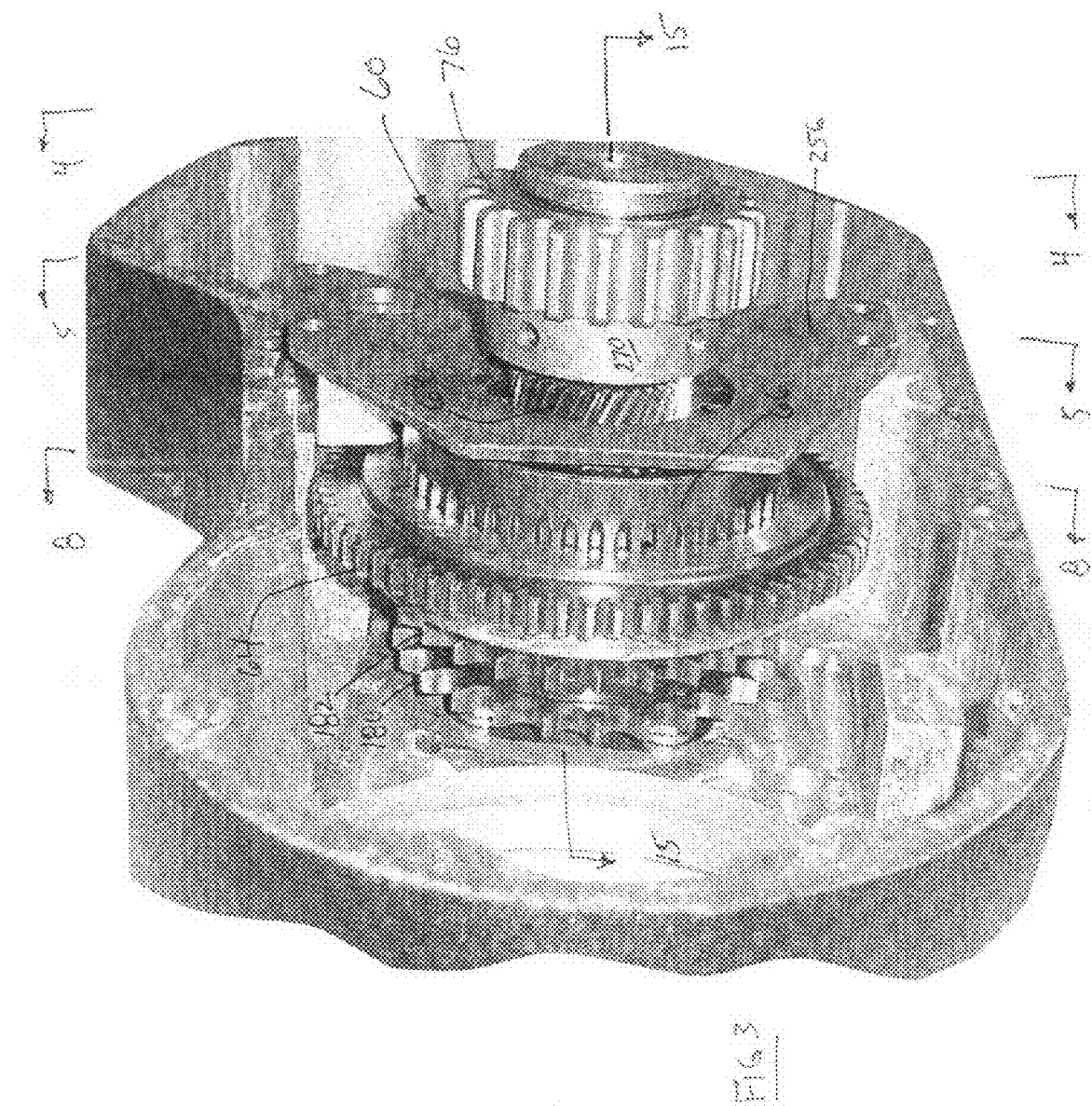

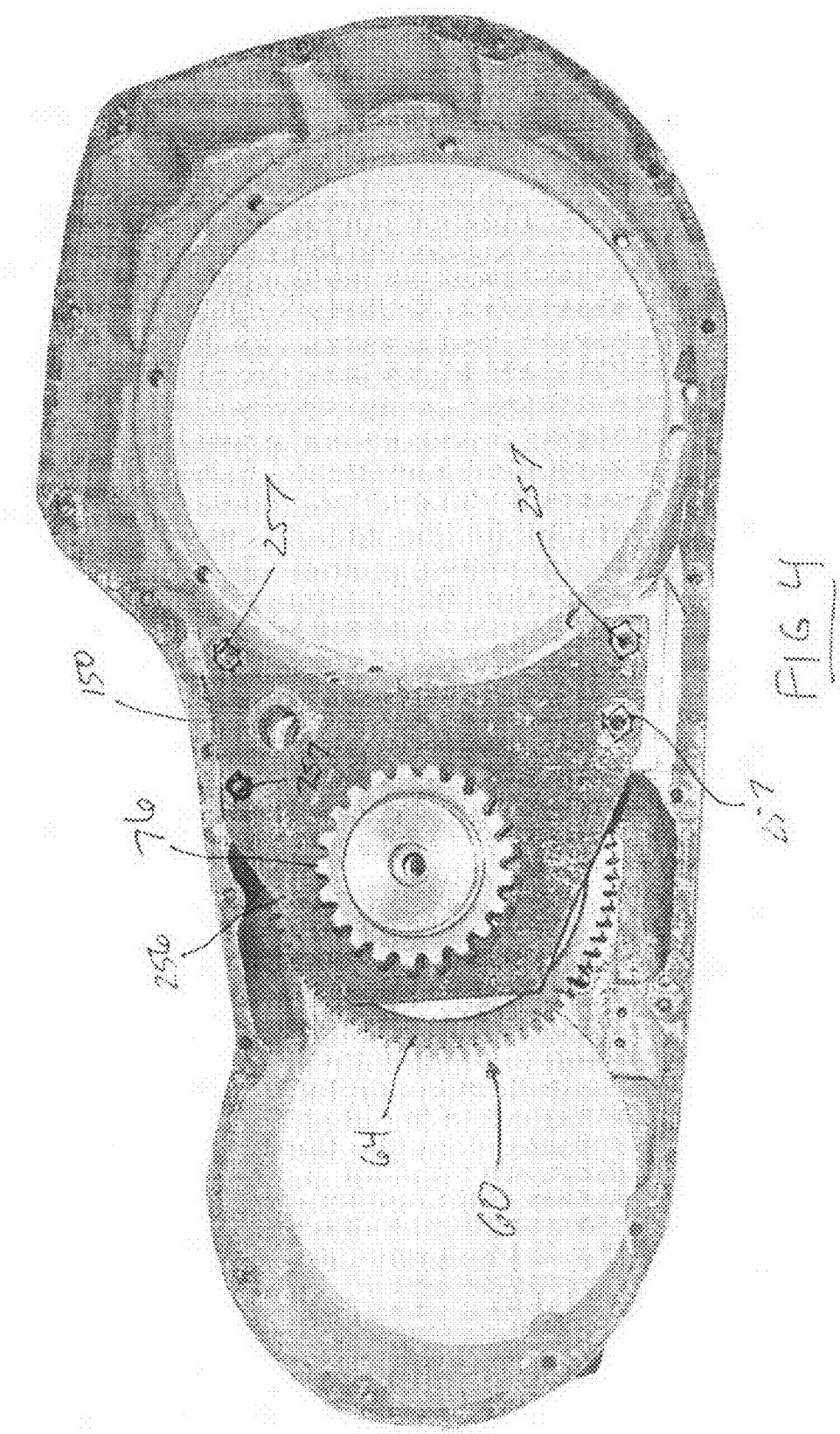

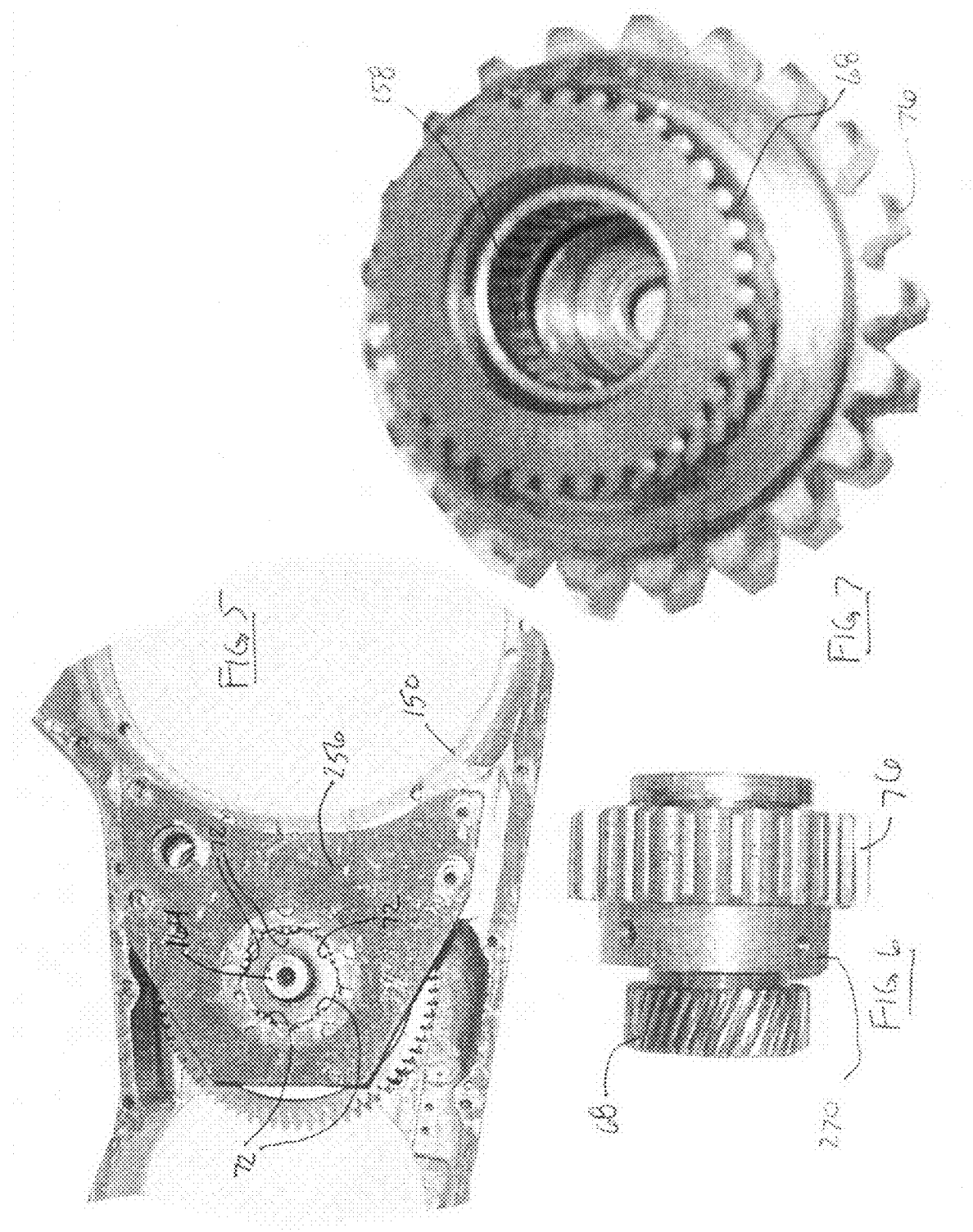

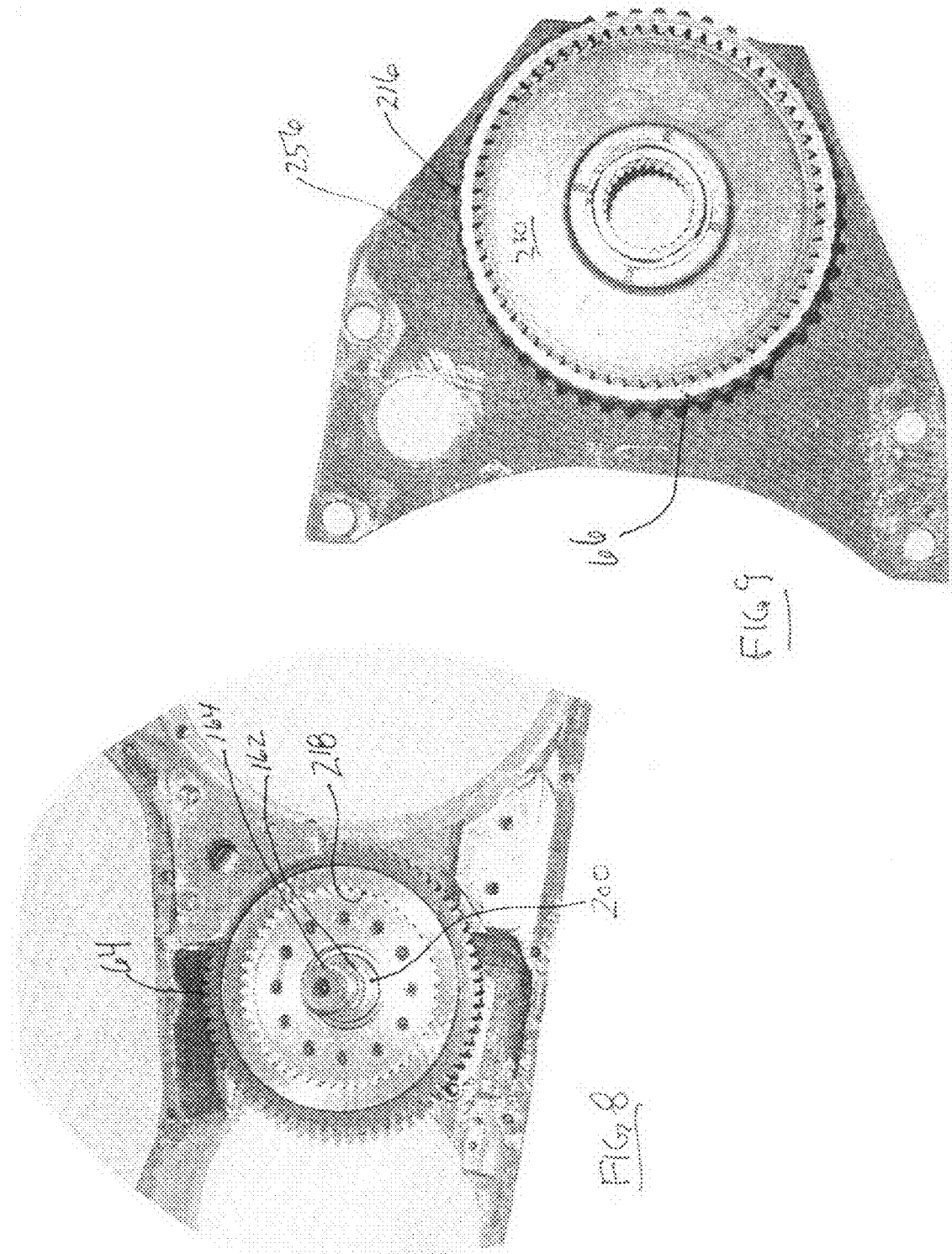

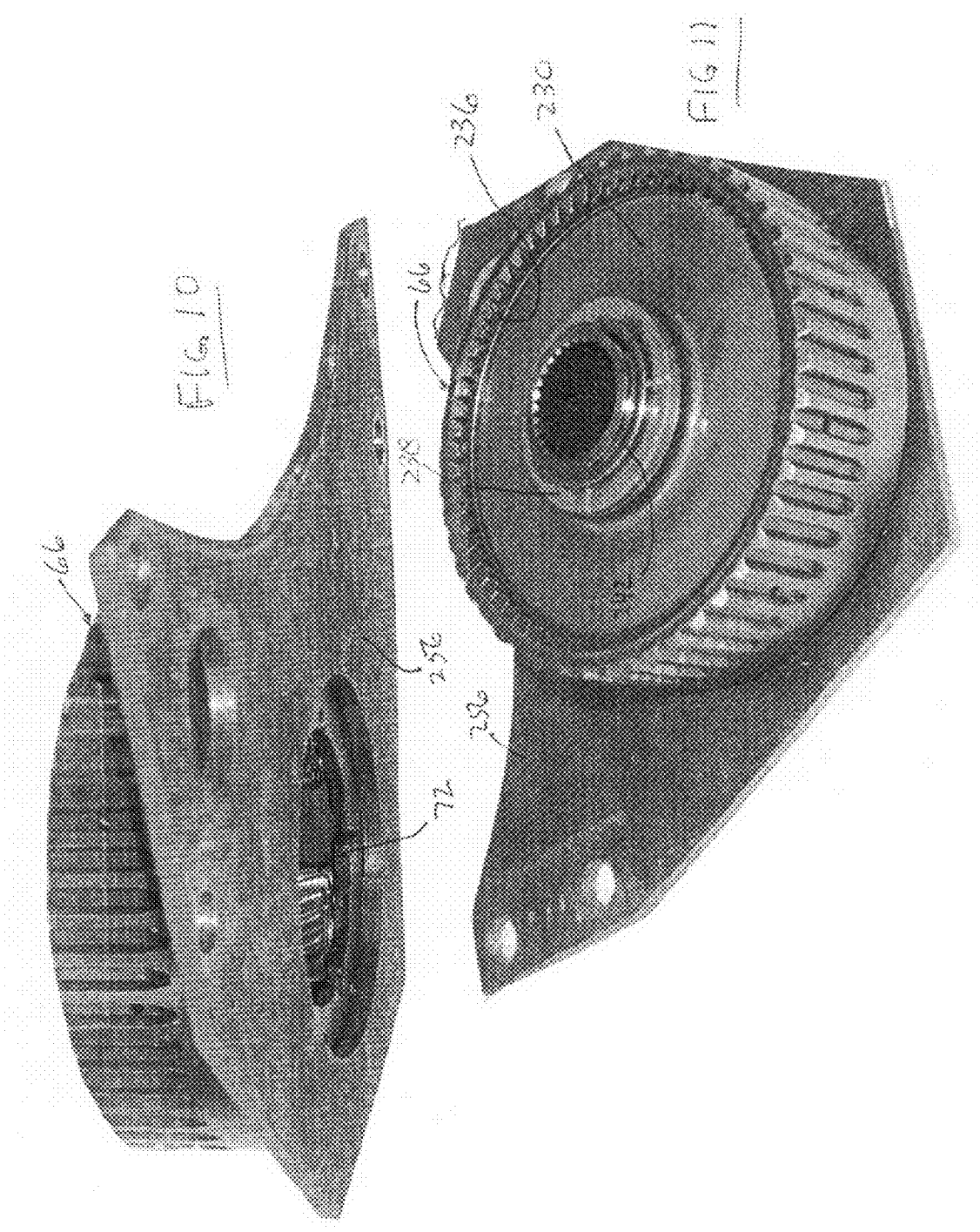

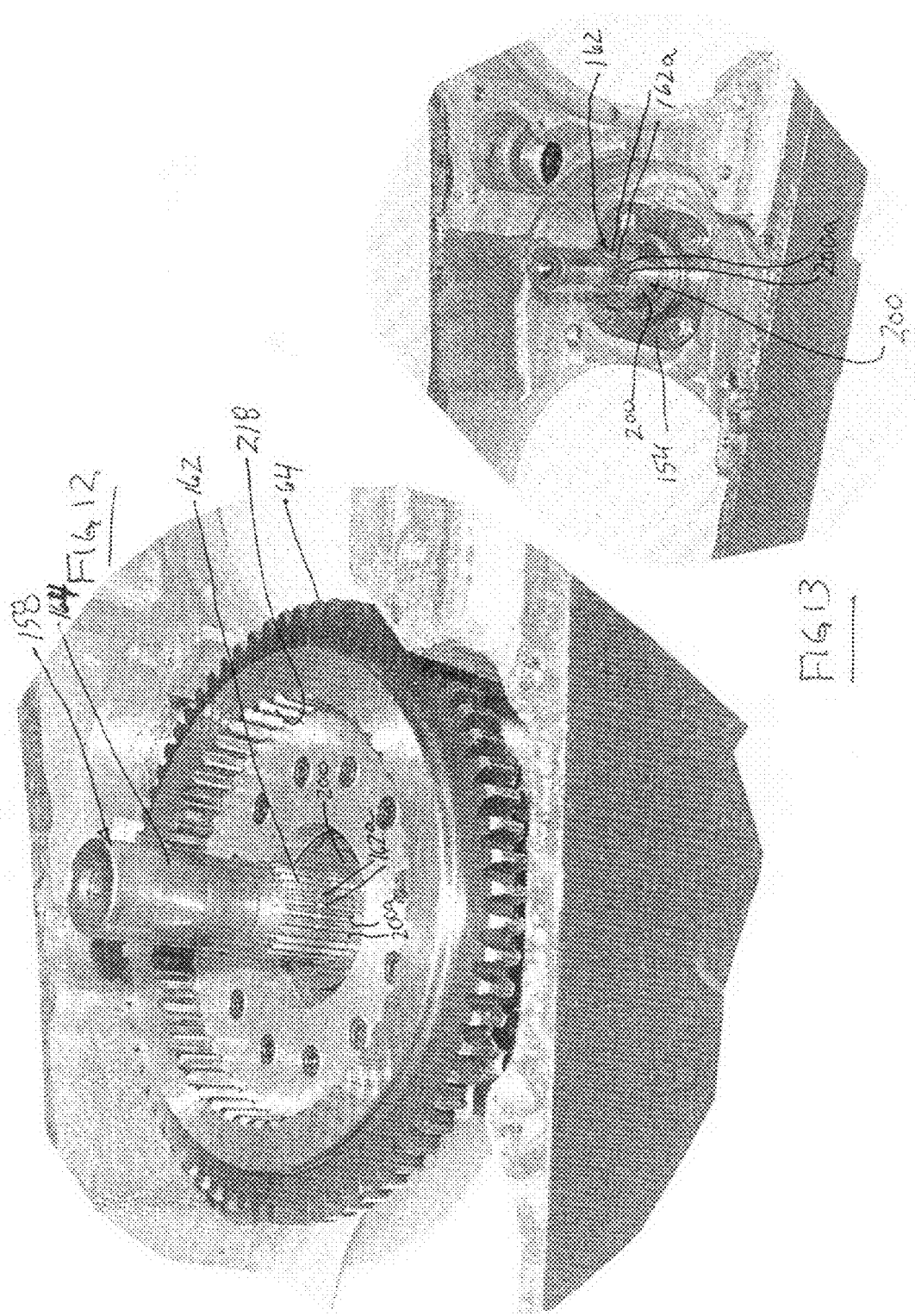

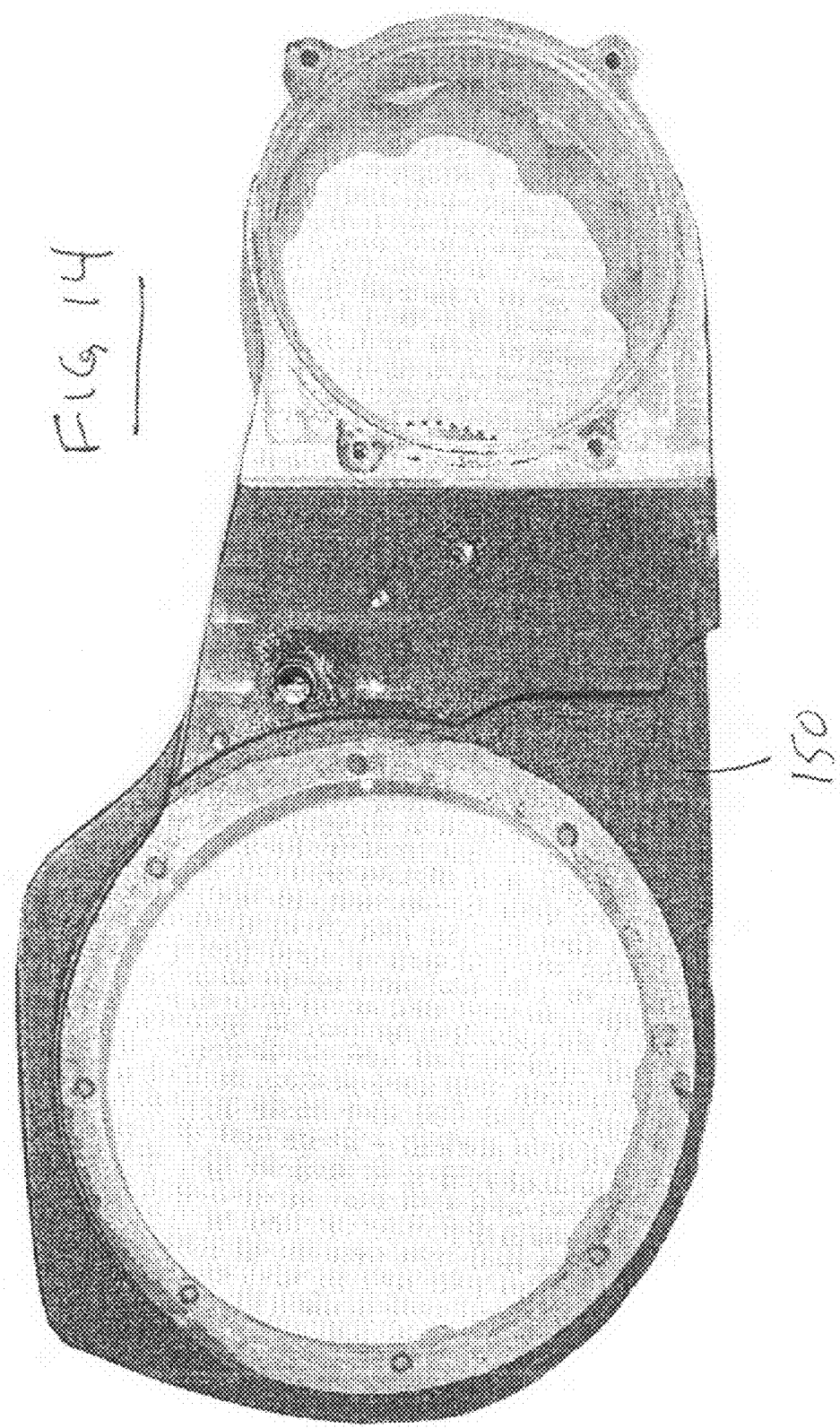

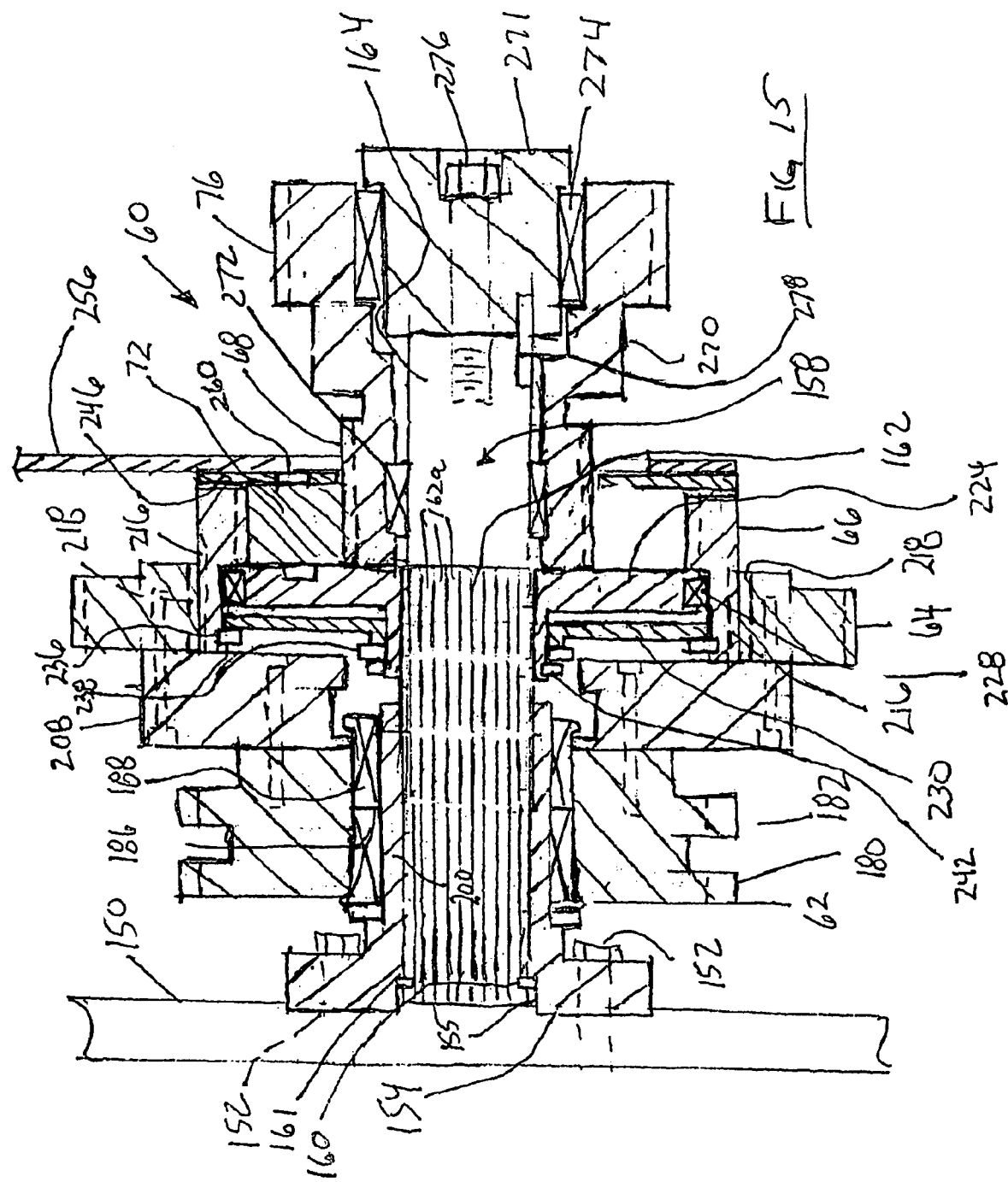

AUTOMATIC TRANSMISSION ARRANGEMENT FOR A MOTORCYCLE

FIELD OF THE INVENTION

This invention relates in general to transmissions and in particular to motorcycle transmissions.

BACKGROUND OF THE INVENTION

HARLEY DAVIDSON motorcycle owners are loyal and enthusiastic about their motorcycles. Owners of HARLEY DAVIDSON motorcycles are generally not reluctant to modify, customize or improve their motorcycles. Aftermarket parts and kits to modify HARLEY DAVIDSON motorcycles are popular.

The traditional HARLEY DAVIDSON drivetrain includes a V-TWIN engine positioned forward the transmission in which both the engine and transmission are independently secured or bolted together and secured to the motorcycle frame. In particular, HARLEY DAVIDSON V-TWIN engine motorcycles incorporate separate cases for the engine and the transmission.

In one well-known configuration, the drivetrain assembly comprises a leftside drive in which the engine includes a crankshaft and output shaft substantially parallel to an input shaft of the transmission. Engine power is coupled to the transmission with a primary belt or chain interconnecting the parallel output and inputs shafts of the engine and transmission respectively. The drive assembly additionally includes a primary drive housing on the leftside of the motorcycle for enclosing the primary belt or chain interconnecting the parallel output and input shafts. The transmission includes an output shaft on the left side that connects by a chain to the rear wheel drive sprocket.

The present inventors have recognized that as riders of motorcycles age, the strength and coordination required to clutch and shift a four or five-speed motorcycle transmission using coordinated movement of arms and legs, can be problematic. The coordinated movements can become too physically taxing for older riders.

The present inventors have recognized the desirability of providing motorcycles, particularly HARLEY DAVIDSON and like motorcycles with a compact and effective automatic transmission arrangement that can make the motorcycle more easily operated by older riders or physically impaired riders.

The present inventors have recognized that the HARLEY DAVIDSON V-TWIN engine motorcycle is a likely candidate for a transmission modification to accommodate an automatic transmission given the separate casings for the engine and transmission on these motorcycles.

There have been attempts to provide a motorcycle with an automatic transmission. Such attempts include those disclosed in U.S. Pat. Nos. 6,390,262; 4,702,340; 5,951,434; 6910,987 and 5,862,717. Some of the embodiments described in these patents however suffer the drawbacks of providing an automatic transmission that is overly complex, bulky, or not adaptable to be easily installed on a HARLEY DAVIDSON motorcycle.

The present inventors have recognized that it would be beneficial if commercially available automobile transmissions could be easily adapted for use on motorcycles.

The present inventors have recognized one problem with utilizing a more readily available automobile automatic transmission on a motorcycle is that a conventional automobile automatic transmission input shaft is designed to rotate clockwise, when viewed looking into an end of the input shaft. Because of its side ways orientation, a conventional motorcycle engine is designed to rotate counterclockwise when viewed looking into an end of the output shaft. Thus, if a conventional automatic transmission is arranged on a motorcycle having its input shaft parallel to the engine output shaft and on the same side of the motorcycle, the two shafts cannot be coupled easily with a chain or belt because of their opposite rotational directions.

SUMMARY OF THE INVENTION

The invention provides an automatic transmission arrangement for a motorcycle. The arrangement includes an intermediate gear assembly between an engine output shaft and a transmission assembly input shaft that allows a conventional automobile automatic transmission to be coupled to a motorcycle engine.

According to the preferred embodiment, the automatic transmission can be of the well-known automotive type having a traditional clockwise rotating operation, looking into an end of the transmission assembly input shaft. The transmission assembly can be oriented to have its input shaft on the left side of the motorcycle. The engine output shaft can also be on the left side of the motorcycle and can rotate counterclockwise looking into an end of the output shaft.

The intermediate gear assembly functions to convert the counterclockwise rotary power of the engine output shaft to a clockwise rotary power at the transmission assembly input shaft.

According to the preferred embodiments, the transmission assembly includes a torque converter connected to its input shaft, a gear train and an output shaft that extends outward on the right side of the motorcycle. The transmission is selected to be of the type having a gear train wherein the output shaft rotates in an opposite rotary direction compared to the transmission assembly input shaft, as viewed looking into the end of the input shaft. This type of automatic transmission is often used on front wheel drive automobiles. The transmission assembly output shaft can be connected to an output sprocket which is connected by a chain to a drive sprocket attached to the rear wheel.

The intermediate gear assembly allows the motorcycle engine output shaft to be arranged in parallel with the transmission assembly input shaft wherein the motorcycle engine output shaft and the transmission assembly input shaft are on the same side of the motorcycle. The intermediate gear assembly includes a ring gear in meshing engagement with a plurality of planet gears, and a sun gear in meshing engagement with the planet gears. The ring gear is fixed for rotation with an intermediate gear assembly input and the sun gear is fixed for rotation with the intermediate gear assembly output.

The powertrain can include a housing and a support plate fixed with respect to the housing, an intermediate shaft fixed to the housing at a base end for no relative rotation therebetween, and an end cap fixed to a distal end of the intermediate shaft. The ring gear is journaled on the intermediate shaft to rotate thereon. The planet gears are rotatably carried on the support plate. The sun gear is journaled on the intermediate shaft to rotate thereon, the sun gear fixed for rotation with the intermediate gear assembly output.

The transmission assembly of the present invention provides for a compact, relatively simple automatic transmission that is particularly adapted for use on HARLEY DAVIDSON motorcycles, and other motorcycles that incorporate a separate casing for each of the engine and transmission. The transmission assembly of the present invention can also be incorporated into motorcycles that use a common casing for the engine and the transmission, with some additional modifications. Furthermore the invention may be useful for other type vehicles where a compact design is advantageous.

Numerous other advantages and features of the present invention will be become readily apparent from the following detailed description of the invention and the embodiments thereof, from the claims and from the accompanying drawings.

BRIEF DESCRIPTION OF THE DRAWINGS

FIG. 3 is a fragmentary perspective view of a portion of FIG. 2 taken generally along line 3-3;

FIG. 4 is an elevation view of the intermediate gear assembly of FIG. 3, taken generally along line 4-4;

FIG. 5 is an elevation view of the intermediate gear assembly of FIG. 3, taken generally along line 5-5;

FIG. 6 is a perspective view of an output gear of the intermediate gear assembly of FIG. 3;

FIG. 7 is a further perspective view of the output gear shown in FIG. 6;

FIG. 8 is an elevation view of the intermediate gear assembly of FIG. 3, taken generally along line 8-8;

FIG. 9 is a backside in view of a ring gear assembly removed from FIG. 8;

FIG. 10 is a top perspective view of the ring gear assembly of FIG. 9;

FIG. 11 is a bottom back side perspective view of the ring gear assembly of FIG. 9;

FIG. 12 is a bottom perspective view of the intermediate gear assembly of FIG. 8;

FIG. 13 is an elevation view of the intermediate gear assembly of FIG. 14;

DETAILED DESCRIPTION OF THE PREFERRED EMBODIMENTS

Figure 1:
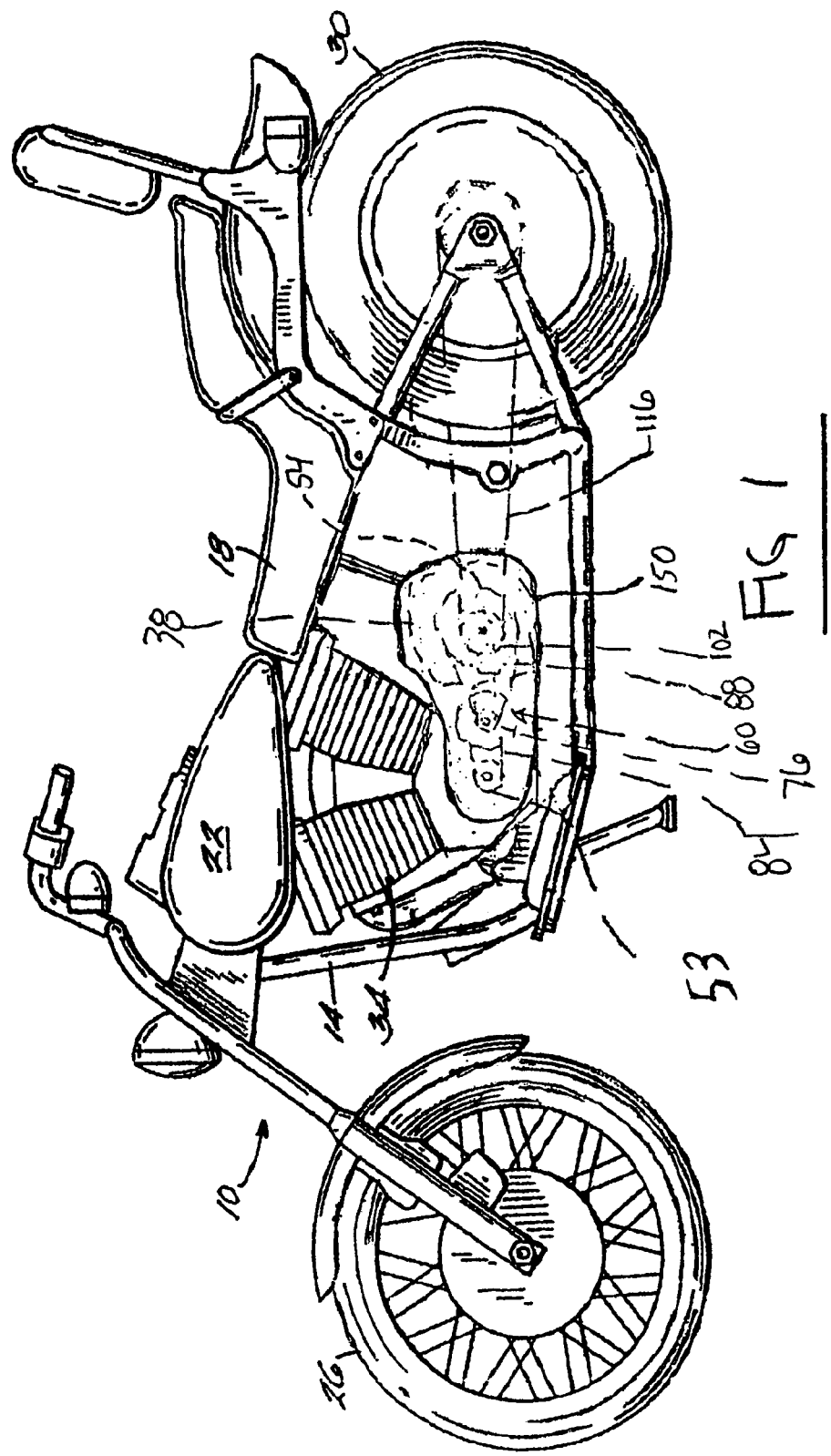
FIG. 1 is a schematic side view of a motorcycle that incorporates the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a motorcycle 10 including a frame 14. A seat 18, a fuel tank 22, front and rear wheels 26, 30, engine 34 and a transmission assembly 38 are mounted to the frame 14. The engine 34 illustrated is a V-TWIN engine popular on HARLEY DAVIDSON motorcycles.

Figure 2:
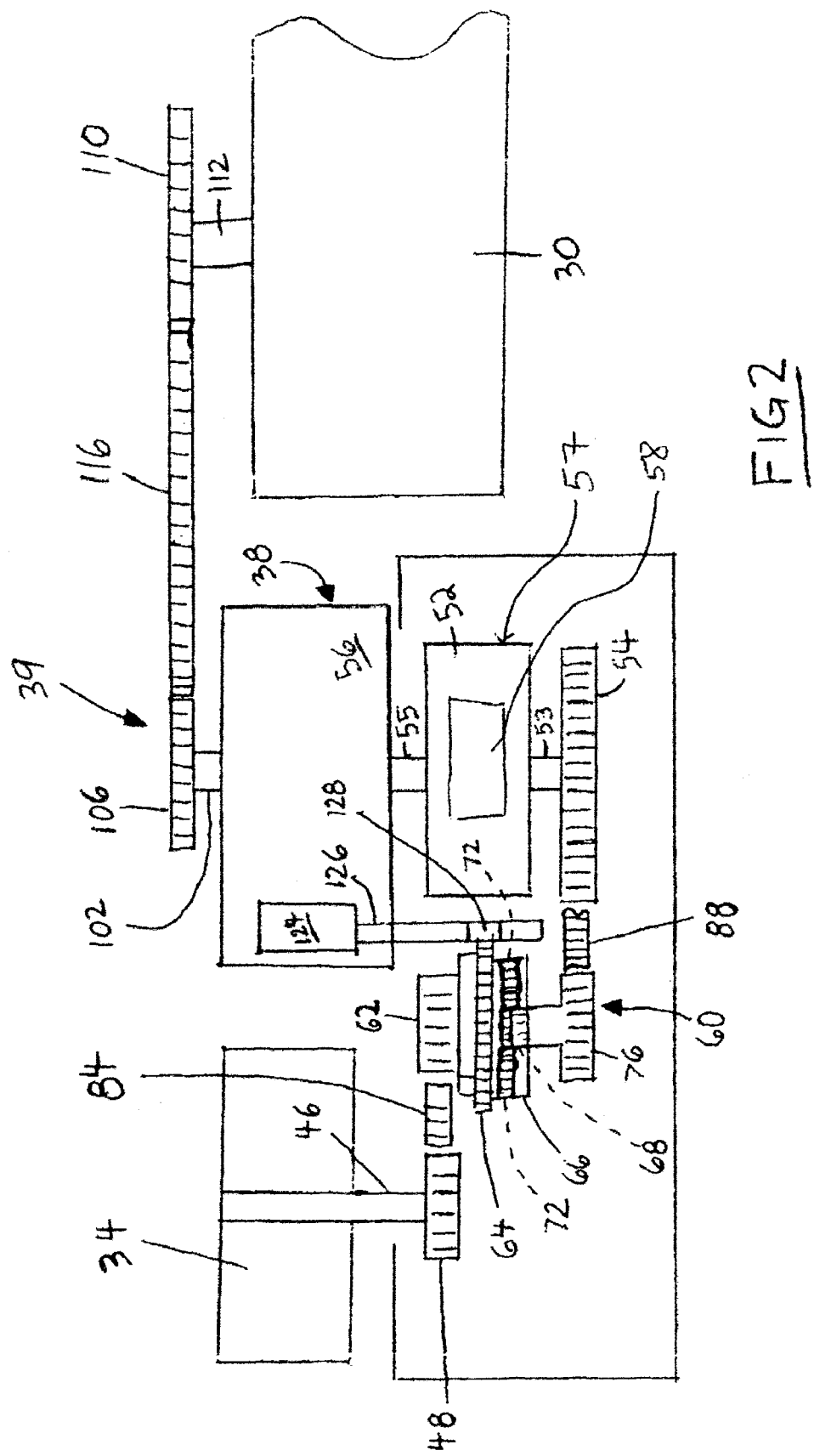
FIG. 2 is a schematic plan view of a drivetrain of the motorcycle of FIG. 1.
Figure 2:
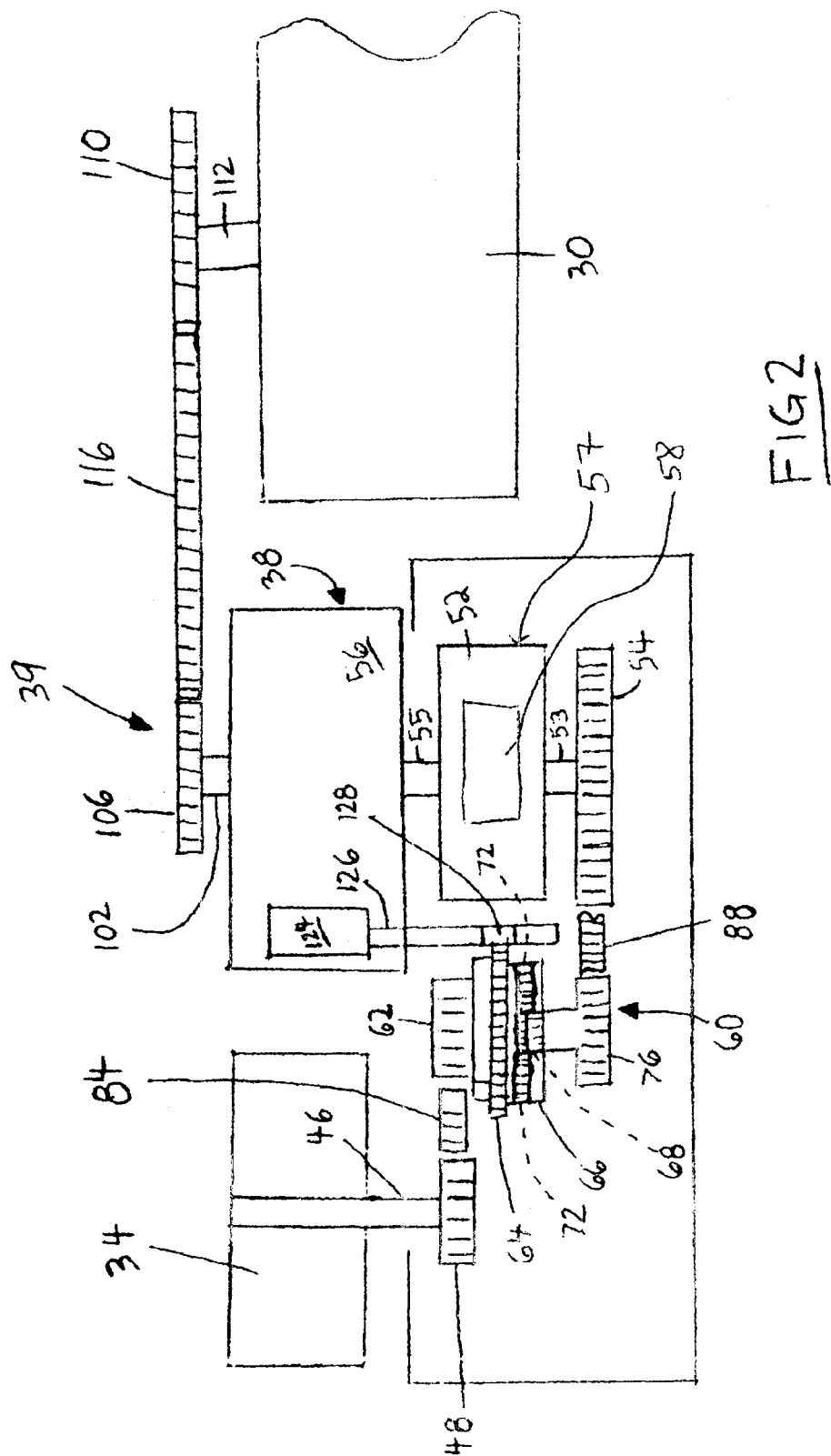
Figure 14:
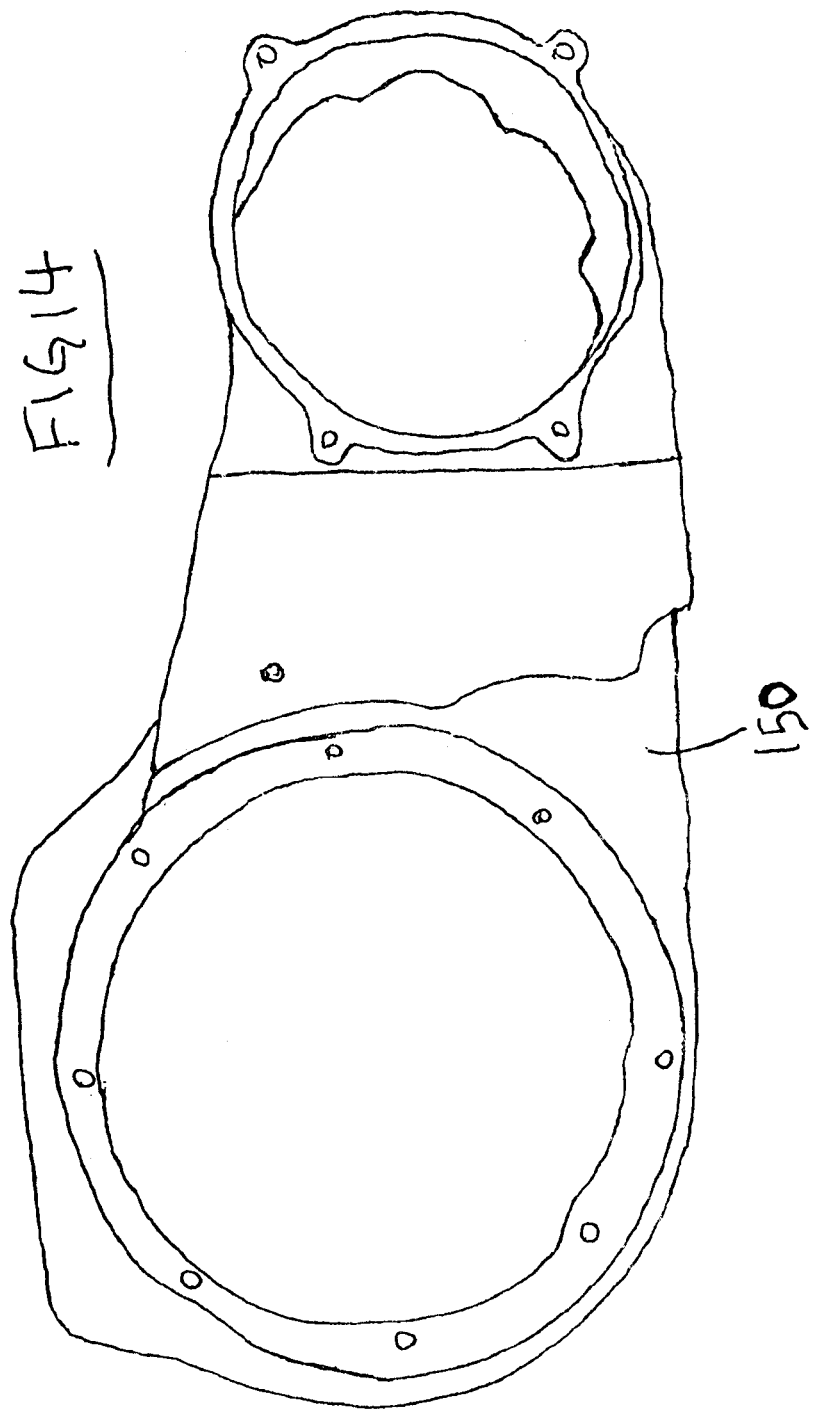
FIG. 14 is a back side view of the intermediate gear housing.
Figure 15:
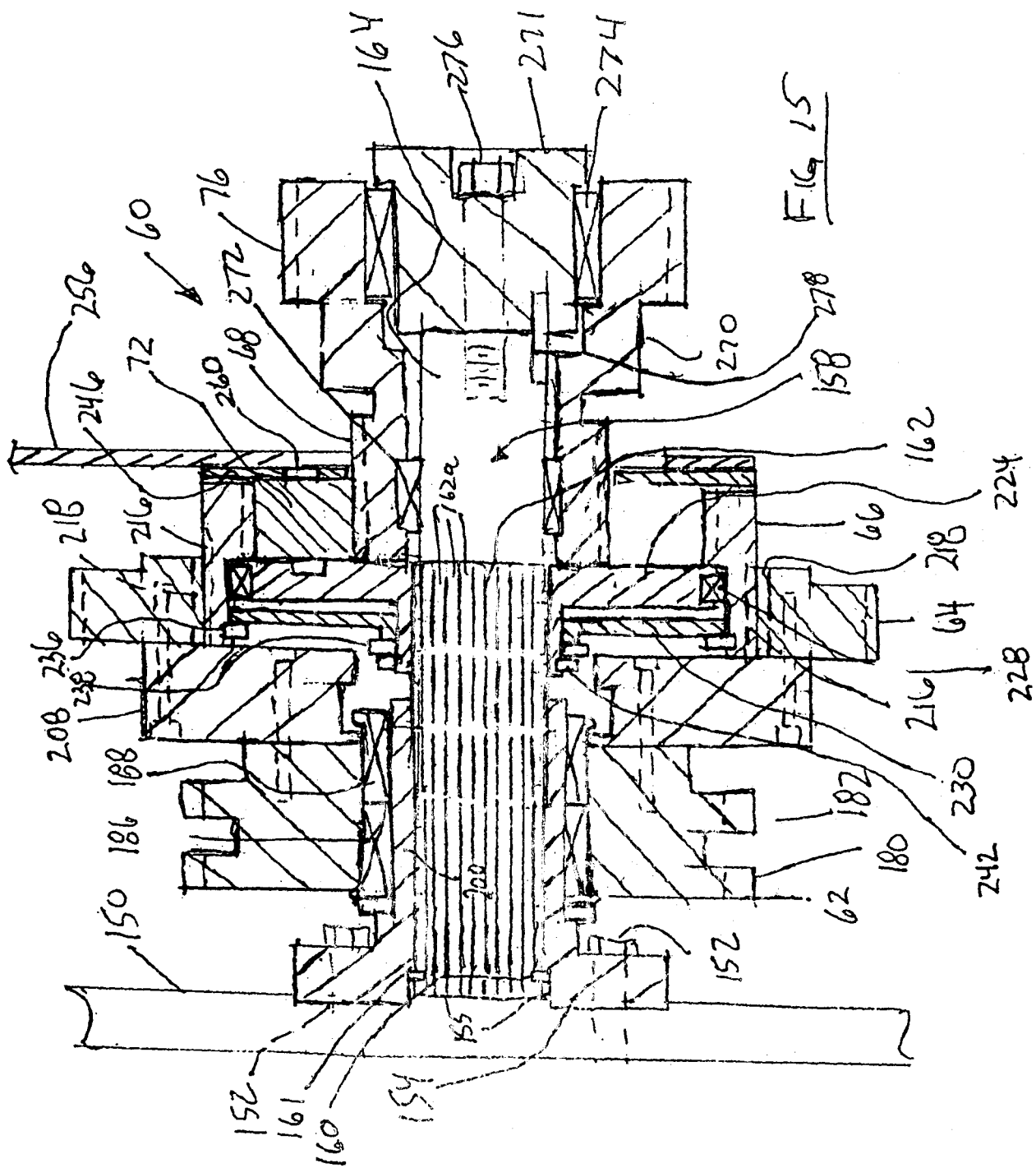
FIG. 15 is a sectional view taken generally along line 15-15 of FIG. 3.

FIG. 2 illustrates a drive train 39 of the motorcycle shown in FIG. 1. The drive train 39 includes the engine 34, the transmission assembly 38 and the rear wheel 30. The engine 34 transmits rotary power via its crankshaft to an engine output shaft 46. The engine output shaft 46 is connected to an engine drive sprocket 48.

The transmission assembly 38 includes a torque converter 52 that has an input shaft 53 connected to a torque converter drive sprocket 54. The torque converter 52 has an output shaft 55 that is connected to a gear box or gear train 56. The torque converter 52 includes fluid coupling elements 58 enclosed in a torque converter housing 57.

An intermediate gear assembly 60 is arranged between the sprockets 48, 54. The intermediate gear assembly comprises an input sprocket 62 fixed to a starter sprocket 64 and a ring gear 66. A sun gear 68 is en mesh with planet gears 72 inside the ring gear 66. The planet gears 72 are en mesh with the ring gear 66. An intermediate output sprocket 76 is fixed to the sun gear 68 to rotate therewith.

Thus, driving the sprocket 48 counterclockwise, as viewed looking into the end of the shaft 46, drives the input sprocket 62 counterclockwise by a chain 84. The chain 84 is wrapped around sprockets 48, 62. The ring gear 66 is also driven counterclockwise. The ring gear 66 drives planet gears 72 counterclockwise. The planet gears 72 drive the sun gear 68 in an opposite, clockwise direction which drives the output sprocket 76 clockwise which drives the torque converter drive sprocket 54 of the transmission assembly 38 in a clockwise direction, via a chain 88 that is wrapped around sprockets 76, 54. The chain 88 is preferably a commercially available SILENT CHAIN.

The gear train 56 is connected to an output shaft 102 fixed to an output sprocket 106 that drives a rear wheel sprocket 110 that is connected to an axle 112 on the rear wheel 30, via a chain 116 that is wrapped around the sprockets 106, 110. The gear train 56 reverses the rotary direction between the input shaft of the transmission and the output shaft 102 such that clockwise rotation of the input shaft rotates the output shaft 102 in a counterclockwise direction, when viewed looking into the end of the input shaft.

A starter motor 124 drives a starter shaft 126 and a pinion gear 128 carried by the starter shaft. The pinion gear is in meshing engagement with the starter sprocket 64. Rotary power from the starter motor turns the engine over by turning the starter sprocket in a counterclockwise direction.

The terms "sprocket" and "pulley" denote elements having outside features that are engageable by either a chain or a belt, to be rotated. A sprocket and a pulley can be identical in structure, and accordingly the terms are used interchangeably herein. Where a chain is described, the invention also encompasses the use of a belt instead of a chain.

FIGS. 3-15 describe the preferred embodiment in more detail. The intermediate gear assembly 60 is mounted to an intermediate gear assembly housing 150 by four fasteners 152 through a baseplate 154. The baseplate 154 includes a central opening 155. An intermediate shaft 158 fits into the central opening 155 and is captured by the baseplate 154 and extends therefrom. A retaining ring or clip 160 is keyed on the intermediate shaft 158 and abuts an annular shoulder 161 within the baseplate opening 155 to capture the intermediate shaft 158 between the housing 150 and the baseplate 154. The intermediate shaft 158 includes a base region 162, and a slightly reduced diameter distal region 164.

Preferably the input sprocket 62 comprises a first chain sprocket part 180 and a second chain sprocket part 182 formed together as a unitary part for receiving the chain 84 in the form of a commercially available double roller chain or a SILENT CHAIN. The input sprocket 62 is journaled by bearings 186, 188 that surround a journal 200 that is fixed to, or formed with, the baseplate 154. The input sprocket 62 is fastened to a backing plate 208. The backing plate 208 is fastened to the starter sprocket 64. The base region 162 of the intermediate shaft 158 includes a longitudinal splines 162a that engage longitudinal grooves 200a within the journal 200 to prevent relative rotation therebetween.

The ring gear 66 includes an outer splined region 216 that is meshed with an inner splined region 218 of the starter sprocket 64 to prevent relative rotation therebetween. A stationary plate 224 fits over the base region 162 of the intermediate shaft 158 in a splined fashion to prevent relative rotation between the stationary plate 224 and the intermediate shaft 158. The ring gear 66 rotates with respect to the stationary plate 224 by way of a bearing 228. An annular cover plate 230 is arranged between the stationary plate 224 and the backing plate 208 and is captured by a large circular spring clip 236 fixed into a groove in the ring gear 66. A washer bearing 238 is captured by a spring clip 242 in a groove in the end portion of the stationary plate 224.

A stationary cover plate 246 is arranged in front of the ring gear 66 and is fixed to a support plate 256. The support plate 256 is fastened to the housing 150 by fasteners 257 (FIG. 4). The support plate 256 also includes an aperture 258 for receiving a distal end of the starter shaft 126.

The intermediate output sprocket 76 is connected to the sun gear 68 by a journal portion 270. The output sprocket 76, the journal portion 270 and the sun gear 68 rotate together and are captured on the intermediate shaft 158 by an end cap 271. The sun gear 68 is journaled on the distal region 164 of the intermediate shaft 158 by a bearing 272, and the output sprocket 76 is journaled on the end cap 271 by a bearing 274. The end cap 271 is fastened to the distal region 164 of the intermediate shaft 158 by a recessed fastener 276. A key 278 fits into keyways that are formed into the parts 271, 158 and ensures that the parts 271, 158 are locked together against relative rotation.

The planet gears 72 are rotationally held by axles 260 that span between the stationary plate 224 and the stationary cover plate 246.

FIG. 4 illustrates the intermediate gear assembly 60 substantially assembled in the housing 150. The starter and starter shaft, the engine and the transmission assembly are not shown.

FIG. 5 shows the intermediate gear assembly 60 of FIG. 4 but with the piece that comprises the sun gear 68, the journal portion 270 and the output sprocket 76 (FIGS. 6 and 7) removed.

FIGS. 8 and 12 show the intermediate gear assembly 60 of FIG. 5 but with the ring gear 66 and attached support plate 256 (FIGS. 9-11) removed.

FIG. 13 shows the intermediate gear assembly of FIGS. 8 and 12 but with the starter sprocket 64 and input sprockets 180, 182 removed.

The description herein leaves out information that would be within the knowledge and skill of one of skill in the art. For example, the gears and shafts within the transmission casing would require the necessary bearings, oil channels and oil seals for proper design and operation. The placement and design of such elements are within the skill of one of ordinary skill in the art given the present disclosure.

From the foregoing, it will be observed that numerous variations and modifications may be effected without departing from the spirit and scope of the invention. It is to be understood that no limitation with respect to the specific apparatus illustrated herein is intended or should be inferred.

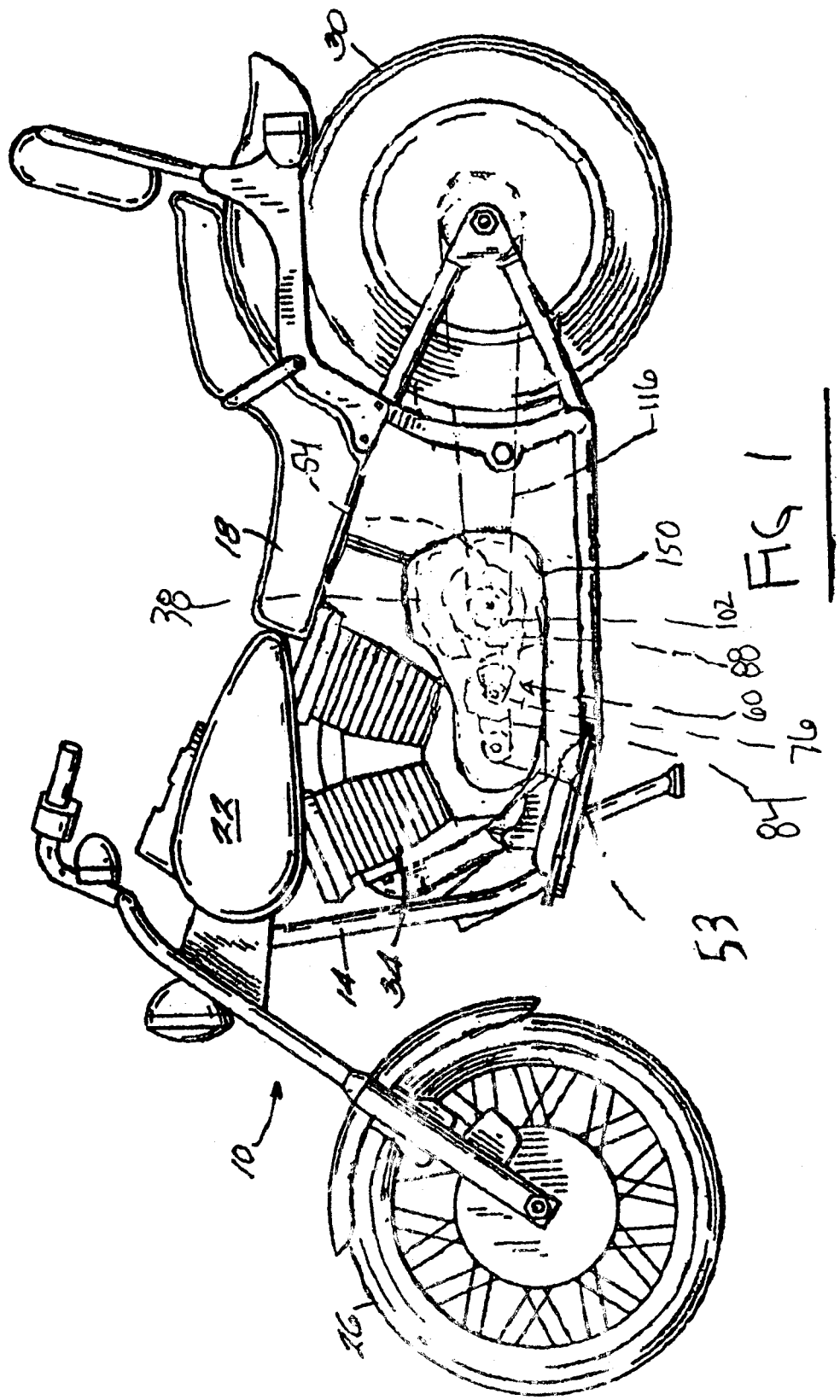

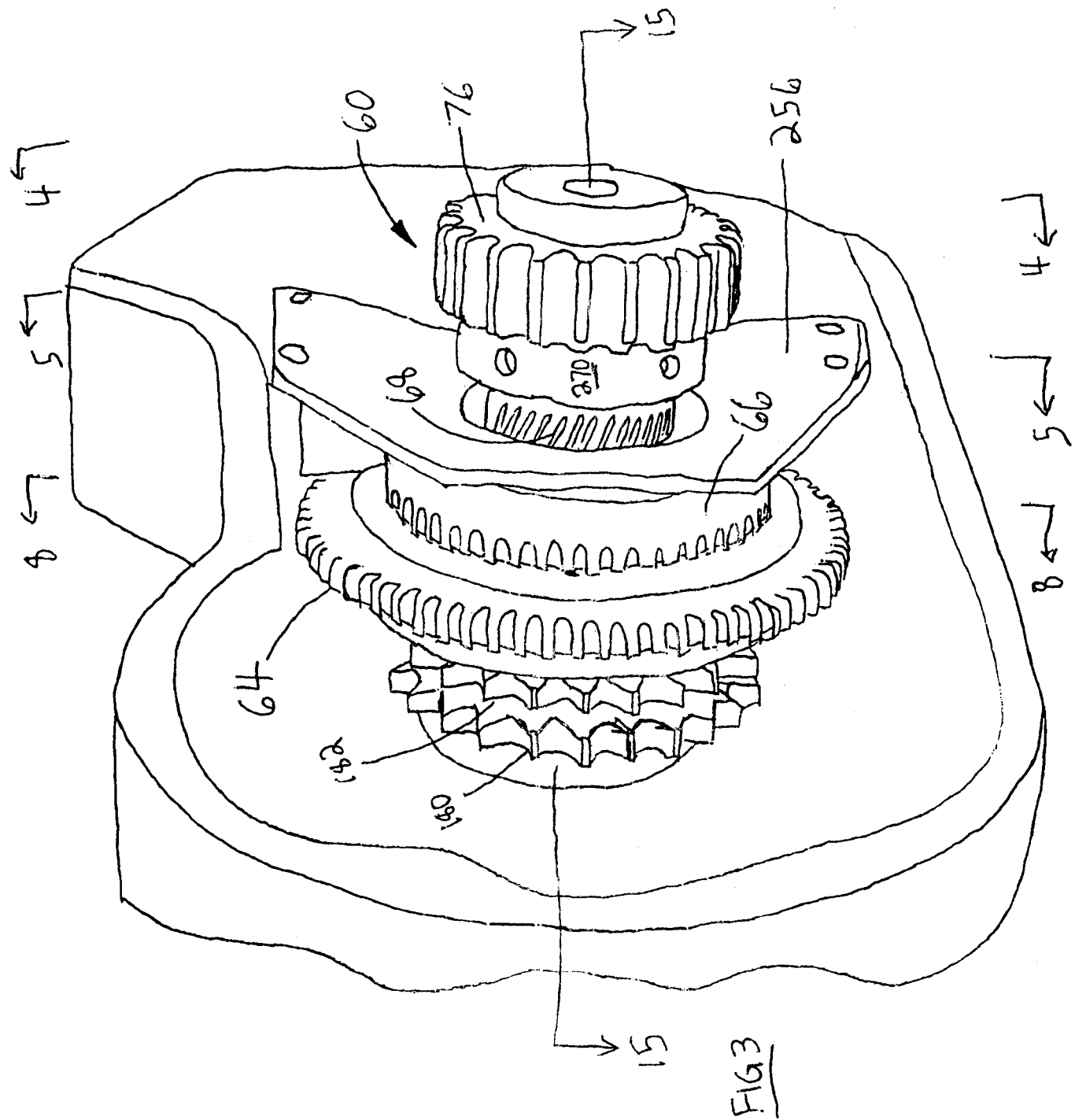

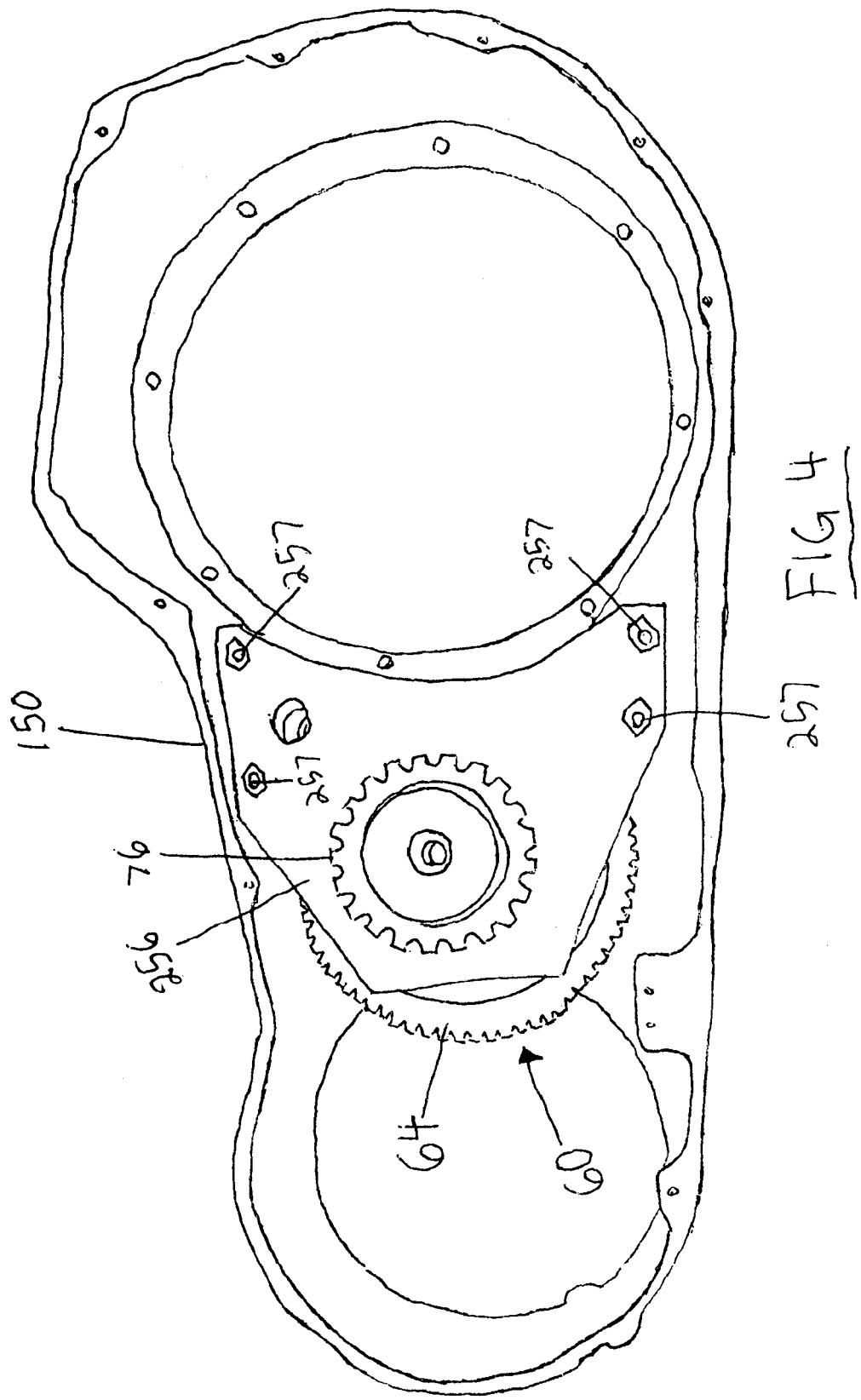

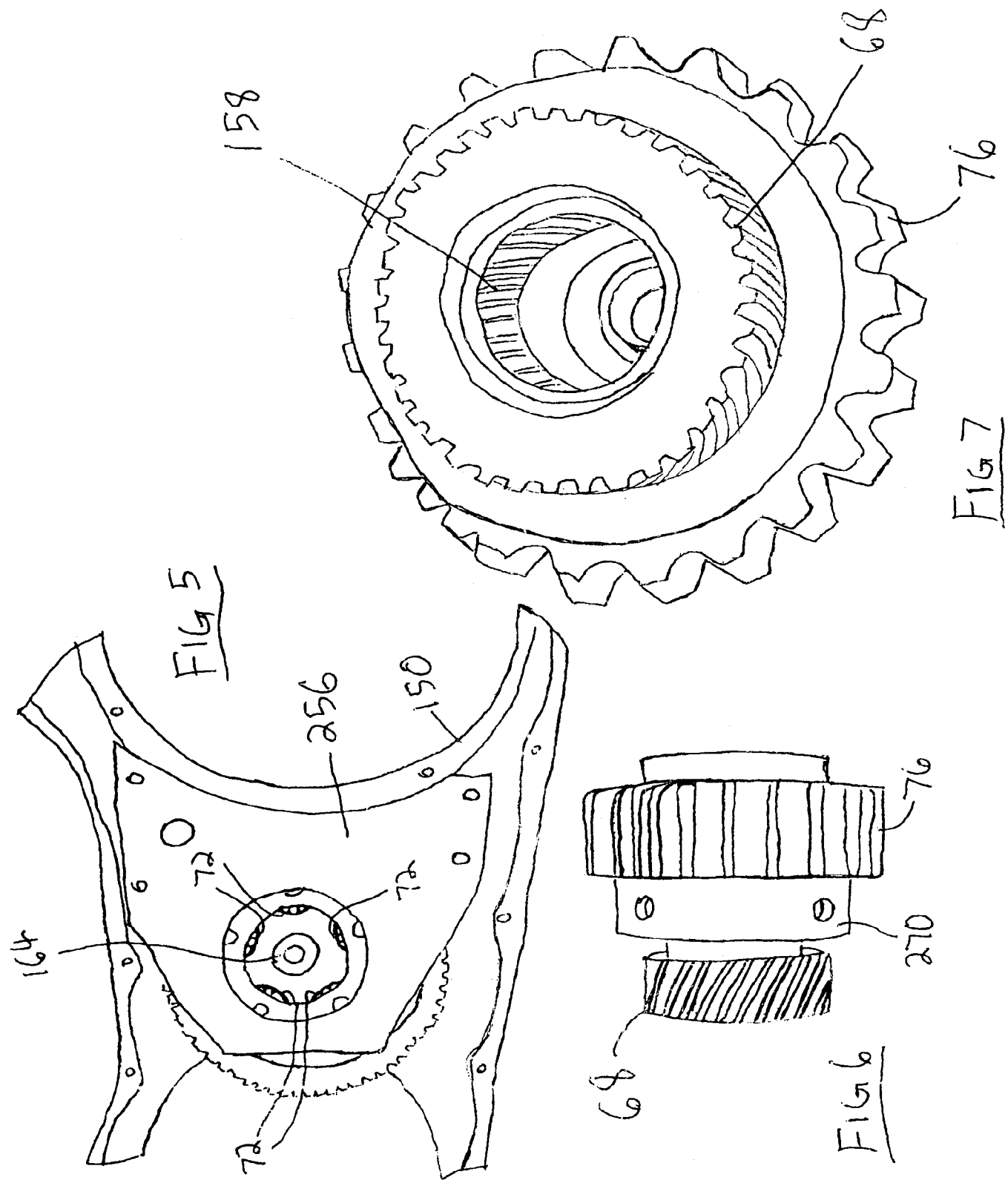

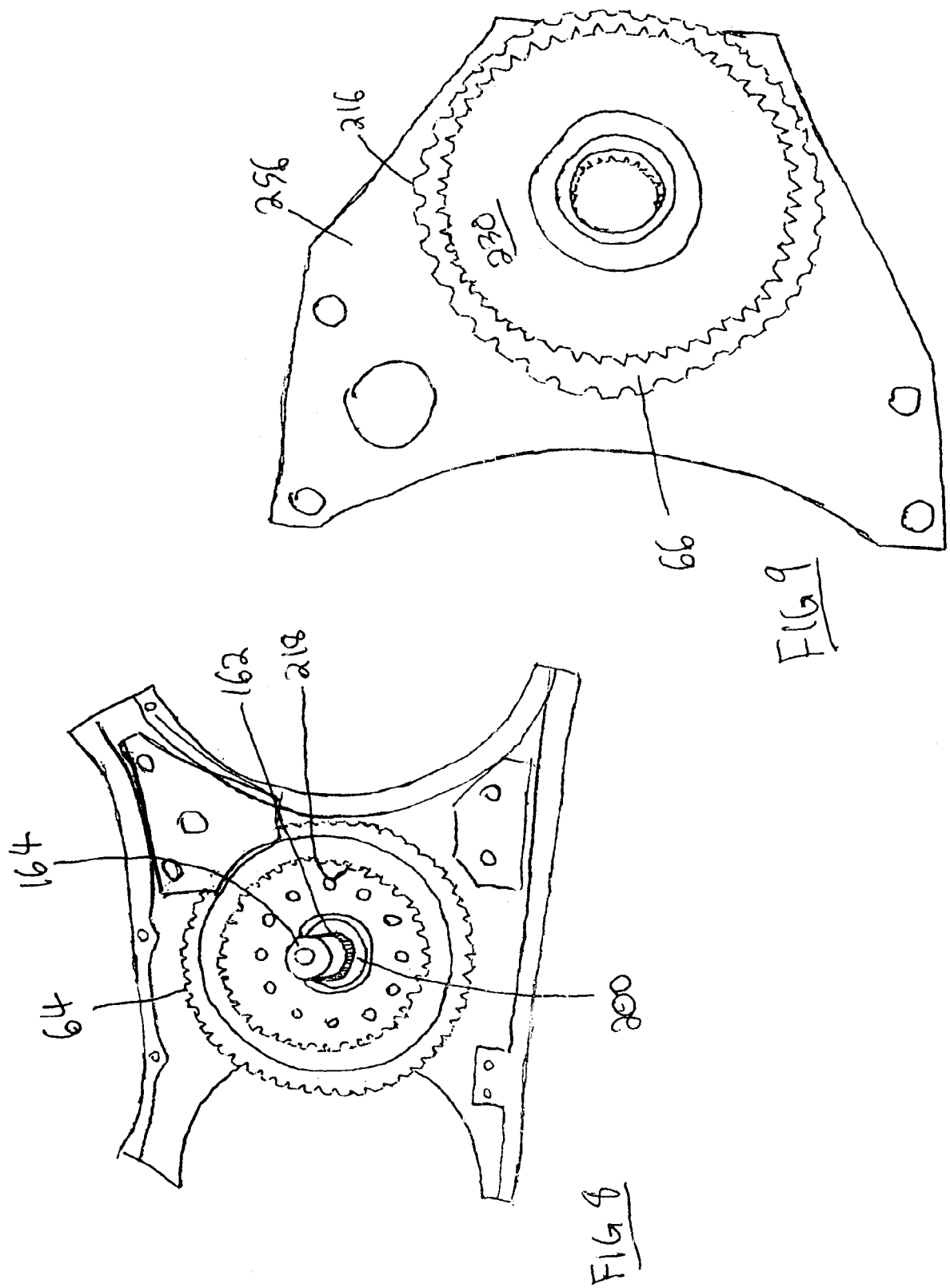

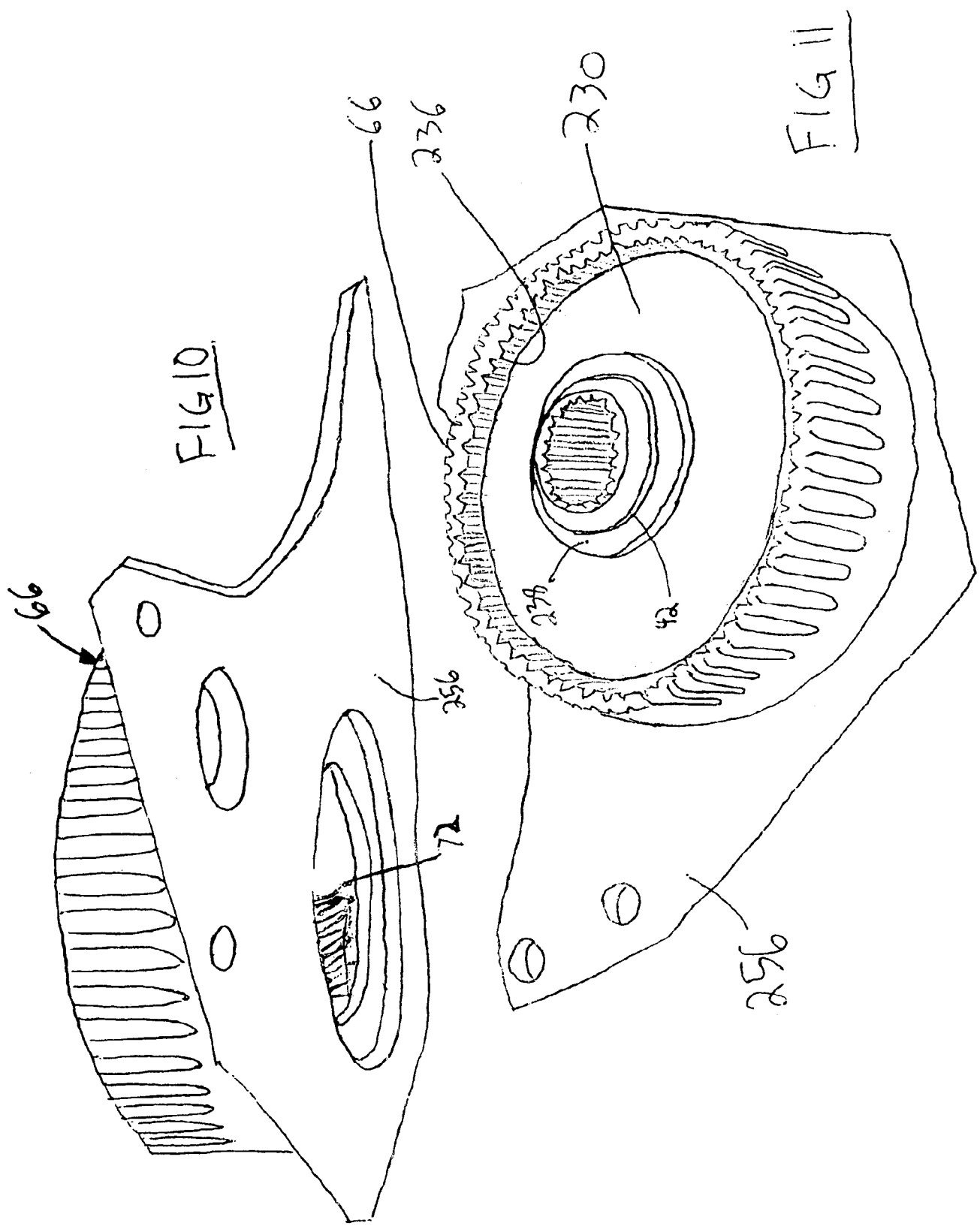

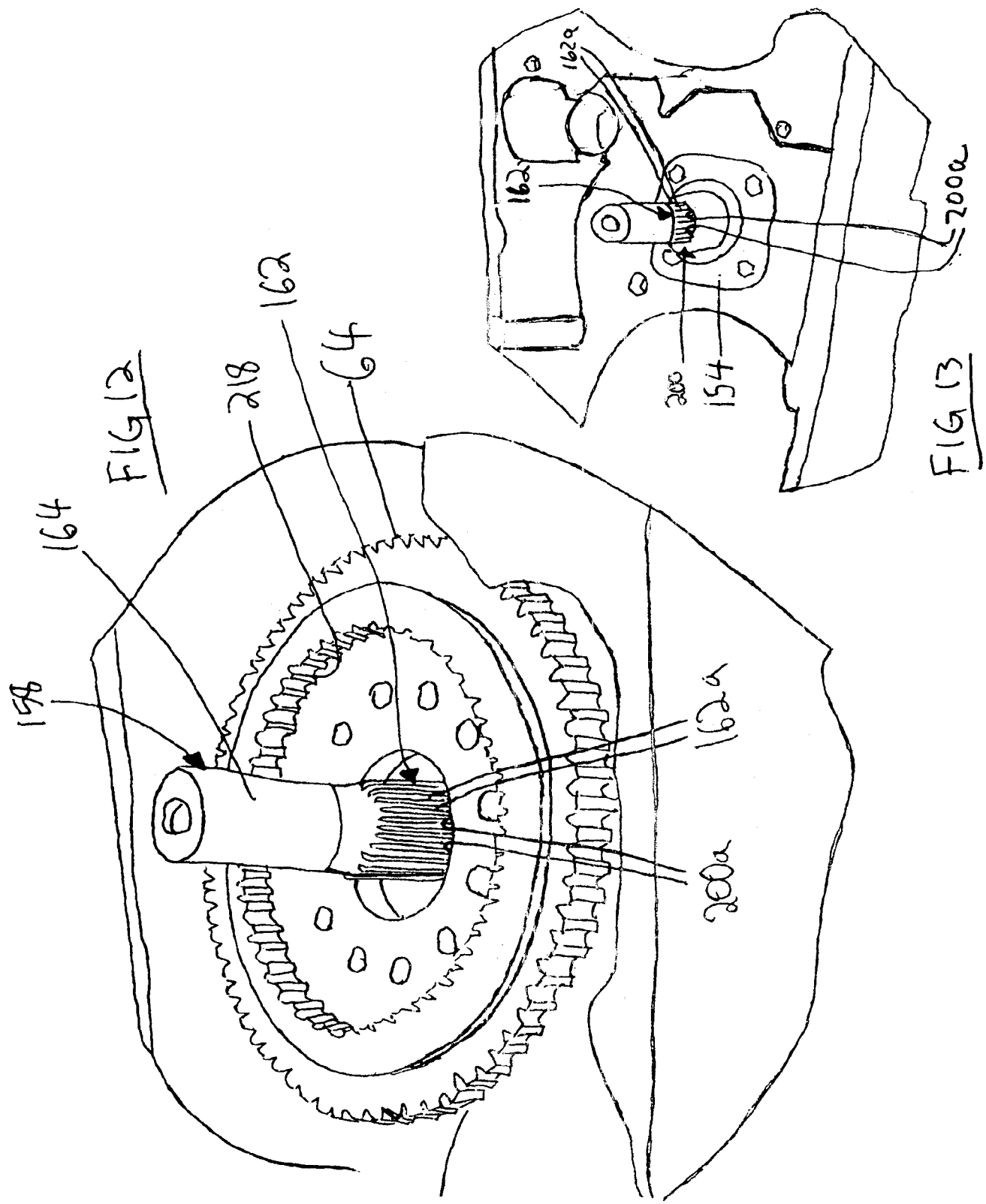

What is claimed is:

1. A powertrain for a motorcycle having a motorcycle engine, comprising:
   a torque converter having a torque converter housing, a torque converter input arranged to receive rotary power and a torque converter output for transmitting rotary power, and fluid coupling elements arranged within said housing to transmit torque between the torque converter input and said torque converter output, said torque converter input located on a first side and rotatable in a first rotary direction corresponding to a forward movement of a motorcycle;
   a gear train having an input for receiving rotary power from said torque converter output, and an output connectable to a wheel of a motorcycle;
   an intermediate gear assembly having an intermediate input for receiving rotary power in a second rotational direction opposite from said first rotational direction, and an intermediate output located on said first side and rotatable in said first rotary direction, and a plurality of intermediate gears arranged between said intermediate input and said intermediate output and engaged in meshing interaction to transfer said rotary power from said intermediate input to said intermediate output and wherein the intermediate input includes an input sprocket to be driven by an engine drive sprocket and the intermediate output includes an output sprocket to drive a torque converter drive sprocket.

2. The powertrain according to claim 1, wherein said intermediate gears comprise a ring gear in meshing engagement with a plurality of planet gears, and a sun gear in meshing engagement with said planet gears, said ring gear fixed for rotation with said intermediate input and said sun gear fixed for rotation with said intermediate output.

3. A powertrain for a motorcycle having a motorcycle engine, comprising:
   a torque converter having a torque converter housing, a torque converter input arranged to receive rotary power and a torque converter output for transmitting rotary power, and fluid coupling elements arranged within said housing to transmit torque between the torque converter input and said torque converter output, said torque converter input located on a first side and rotatable in a first rotary direction corresponding to a forward movement of a motorcycle;
   a gear train having an input for receiving rotary power from said torque converter output, and an output connectable to a wheel of a motorcycle;
   an intermediate gear assembly having an intermediate input for receiving rotary power in a second rotational direction opposite from said first rotational direction, and an intermediate output located on said first side and rotatable in said first rotary direction, and a plurality of intermediate gears arranged between said intermediate input and said intermediate output and engaged in meshing interaction to transfer said rotary power from said intermediate input to said intermediate output; wherein said intermediate gears comprise a ring gear in meshing engagement with a plurality of planet gears, and a sun gear in meshing engagement with said planet gears, said ring gear fixed for rotation with said intermediate input and said sun gear fixed for rotation with said intermediate output;
   a housing and a support plate fixed with respect to said housing;
   an intermediate shaft fixed to said housing at a base end for no relative rotation therebetween; and
   an end cap fixed to a distal end of said intermediate shaft, said ring gear journaled on said intermediate shaft to rotate thereon, said planet gears rotatably carried on said support plate, said sun gear journaled on said intermediate shaft to rotate thereon, said sun gear fixed for rotation with said intermediate output.

4. The powertrain of claim 1, wherein both the engine drive sprocket and the torque converter drive sprocket are on the same side of the motorcycle.

5. The powertrain of claim 4, further comprising an engine output shaft connected to the engine drive sprocket and a transmission assembly input shaft connected to the torque converter output, wherein the engine output shaft is parallel with the transmission assembly input shaft.

6. The powertrain of claim 5, wherein the intermediate gear assembly is arranged such that the gears have horizontal axes.

7. The powertrain of claim 1, wherein the intermediate gear assembly is arranged such that the gears are oriented having horizontal axes.

8. A powertrain for a motorcycle having a motorcycle engine, comprising:
- a torque converter with a torque converter drive sprocket rotable in a first rotary direction corresponding to a forward movement of a motorcycle;
- an engine drive sprocket rotable in a secondary rotary direction opposite from said first rotary direction;
- an intermediate gear assembly disposed between the torque converter drive sprocket and the engine drive sprocket, the intermediate gear assembly having an input for receiving rotary power from the engine drive sprocket, gears and an output for transferring rotary power received from the input to the torque converter drive sprocket;
- wherein said intermediate gear assembly comprises a ring gear in meshing engagement with a plurality of planet gears, and a sun gear in meshing engagement with said planet gears, said ring gear fixed for rotation with said intermediate input and said sun gear fixed for rotation with said intermediate output;
- wherein said intermediate gear assembly includes a housing and a support plate fixed with respect to said housing;
- an intermediate shaft fixed to said housing at a base end for no relative rotation therebetween; and
- said ring gear journaled on said intermediate shaft to rotate thereon, said planet gears rotatably carried on said support plate, said sun gear journaled on said intermediate shaft to rotate thereon, said sun gear fixed for rotation with said intermediate output.

9. The powertrain of claim 8, wherein both the engine drive sprocket and the torque converter drive sprocket are on the same side of the motorcycle.

10. The powertrain of claim 9, further comprising an engine output shaft connected to the engine drive sprocket and a transmission assembly input shaft connected to the torque converter, wherein the engine output shaft is parallel with the transmission assembly input shaft.

11. The powertrain of claim 10, wherein the intermediate gear assembly is arranged such that the gears are oriented having horizontal axes.

* * * * *

UNITED STATES PATENT AND TRADEMARK OFFICE
CERTIFICATE OF CORRECTION

| | | |
|---|---|---|
| PATENT NO. | : 7,886,634 B2 | Page 1 of 12 |
| APPLICATION NO. | : 11/900469 | |
| DATED | : February 15, 2011 | |
| INVENTOR(S) | : Walters et al. | |

It is certified that error appears in the above-identified patent and that said Letters Patent is hereby corrected as shown below:

Title page, illustrative fig. 2 should be deleted and substitute therefore the attached title page consisting of illustrative fig. 2.

In the Drawings

The drawing sheets 1-10 of 10 consisting of Fig(s) 1-15 should be deleted and substitute therefore the attached drawing sheets 1-10 of 10 consisting of Fig(s) 1-15.

Signed and Sealed this
Fifth Day of July, 2011

David J. Kappos
*Director of the United States Patent and Trademark Office*

(12) United States Patent
Walters et al.

(10) Patent No.: US 7,886,634 B2
(45) Date of Patent: Feb. 15, 2011

(54) AUTOMATIC TRANSMISSION ARRANGEMENT FOR A MOTORCYCLE

(75) Inventors: Richard L. Walters, Plano, IL (US); Richard L. Walters, II, Lombard, IL (US)

(73) Assignee: Walters Manufacturing, Inc., Plano, IL (US)

(*) Notice: Subject to any disclaimer, the term of this patent is extended or adjusted under 35 U.S.C. 154(b) by 527 days.

(21) Appl. No.: 11/900,469

(22) Filed: Sep. 12, 2007

(65) Prior Publication Data
US 2009/0069144 A1 Mar. 12, 2009

(51) Int. Cl.
F16H 3/00 (2006.01)
F16H 48/00 (2006.01)

(52) U.S. Cl. .................. 74/810.1; 475/12
(58) Field of Classification Search ........... 74/810.1; 475/12, 201; 192/3.52, 3.53
See application file for complete search history.

(56) References Cited
U.S. PATENT DOCUMENTS

| | | | | |
|---|---|---|---|---|
| 4,070,925 A * | 1/1978 | Yoshida | | 74/720 |
| 4,163,399 A * | 8/1979 | Yamada et al. | | 74/732.1 |
| 5,030,179 A * | 7/1991 | Ganoung | | 475/50 |
| 6,807,927 B2 * | 10/2004 | Czysz | | 123/59.6 |
| 6,910,987 B2 * | 6/2005 | Richards | | 475/283 |
| 2006/0234829 A1 * | 10/2006 | Berger et al. | | 477/52 |

* cited by examiner

Primary Examiner—Tisha D Lewis
(74) Attorney, Agent, or Firm—Erickson Law Group, PC

(57) ABSTRACT

A powertrain for a motorcycle includes a torque converter having an input and an output with a fluid coupling between the input and output, a gear train between the torque converter output and the rear wheel of the motorcycle, and an intermediate gear assembly that reverses the rotational direction of the motorcycle engine output shaft to the torque converter input. The intermediate gear assembly allows the motorcycle engine output shaft to be arranged in parallel with the torque converter input shaft wherein the motorcycle engine output shaft and the torque converter input shaft are on the same side of the motorcycle. The intermediate gear assembly includes a ring gear in meshing engagement with a plurality of planet gears, and a sun gear in meshing engagement with the planet gears. The ring gear is fixed for rotation with the intermediate input and the sun gear is fixed for rotation with the intermediate output.

11 Claims, 10 Drawing Sheets

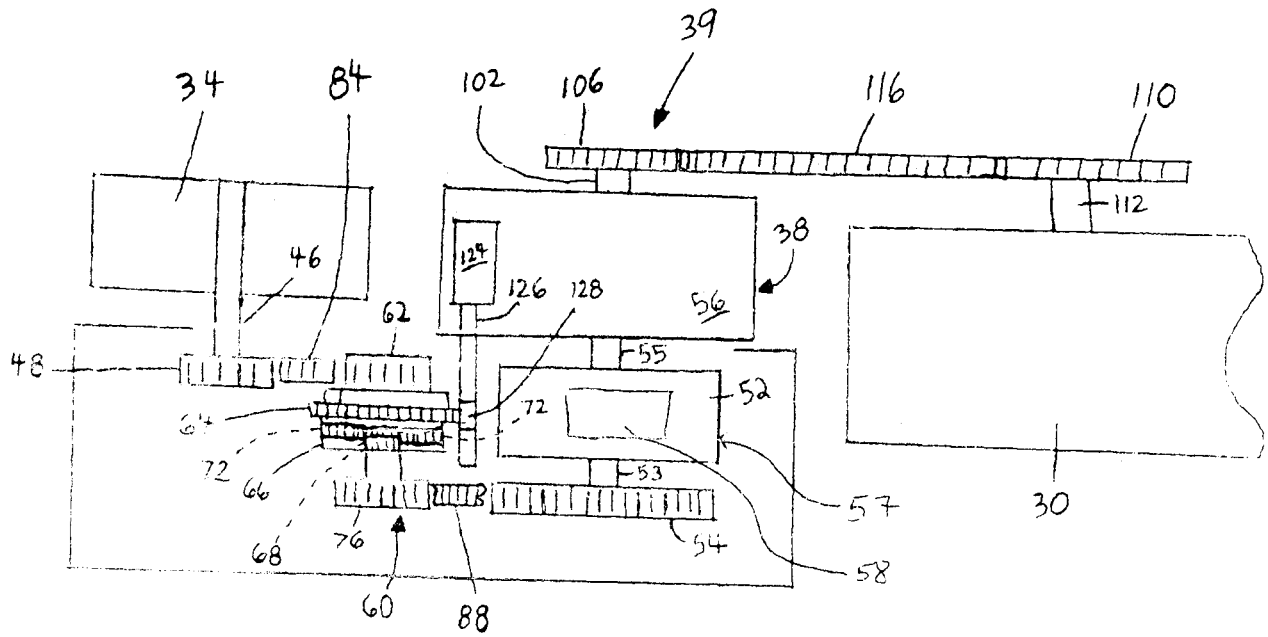

FIG 2